United States Patent [19]

Burth

[11] Patent Number: 4,671,467
[45] Date of Patent: Jun. 9, 1987

[54] APPARATUS FOR WINDING AN ENDLESS STRIP IN A STORAGE MEANS

[76] Inventor: Willi Burth, Marienplatz 4, Ravensburg, Fed. Rep. of Germany, 7980

[21] Appl. No.: 747,350

[22] Filed: Jun. 21, 1985

Related U.S. Application Data

[63] Continuation-in-part of Ser. No. 648,385, Sep. 7, 1984, abandoned, which is a continuation of Ser. No. 363,896, Mar. 31, 1982, abandoned, which is a continuation of Ser. No. 114,231, Jan. 21, 1980, abandoned.

[30] Foreign Application Priority Data

Jan. 29, 1979 [AT] Austria ............................ 642/79

[51] Int. Cl.⁴ ..................... B65H 17/48; G03B 21/00; G03B 21/50
[52] U.S. Cl. ............................. 242/55.19 R; 352/128
[58] Field of Search ............... 242/55.18, 55.19 R, 242/55.19 A; 360/93; 352/128, 78

[56] References Cited

U.S. PATENT DOCUMENTS

| | | | |
|---|---|---|---|
| 2,020,521 | 11/1935 | Scott | 242/55.19 R |
| 2,338,421 | 1/1944 | Fries | 242/55.19 R |
| 3,722,809 | 3/1973 | Leisring | 242/55.19 R |
| 3,823,890 | 7/1974 | Potts | 242/55.18 |
| 4,169,566 | 10/1979 | Boudouris et al. | 242/55.18 |

FOREIGN PATENT DOCUMENTS 325083  2/1930  United Kingdom ......... 242/55.19 R

Primary Examiner—Billy S. Taylor
Attorney, Agent, or Firm—Jerry Cohen; William E. Noonan

[57] ABSTRACT

Endless strips, of film or the like, arranged in concentric inner and outer coils thereof (at least two, but possibly more) are provided as tightly wound coils with substantially no space between turns of a coil, but with radial space between the coils with a separate carriage element carrying the coils for independent rotation at different speeds but with a common velocity of the outermost turn of the outer coil and innermost turn of the inner coil corresponding to the velocity of a length of strip therebetween (moving through a film projector or other external usage means for the strip). The inner coil preferably rotates faster than the outer coil and is played out completely so that new inner coils are formed from time to time by infeed from the outer coil(s).

7 Claims, 12 Drawing Figures

APPARATUS FOR WINDING AN ENDLESS STRIP IN A STORAGE MEANS

CROSS REFERENCE TO RELATED APPLICAIONS

This is a continuation in part of copending U.S. patent application Ser. No. 648,385 filed Sept. 7, 1984, and now abandoned which is a continuation of U.S. patent application Ser. No. 363,896 filed Mar. 31, 1982, and now abandoned, which was in turn a continuation of U.S. patent application Ser. No. 114,231 filed Jan. 21, 1980, and now abandoned.

BACKGROUND OF THE INVENTION

The invention relates to an apparatus for winding an endless strip (e.g. a film strip to be shown with a projector) in a storage means. In a known apparatus the storage means for the endless strip is in the form of two concentric coils merging directly into each other. From the optical point of view, the coil may be regarded as a solid unit, but from a functional point of view, it is divided into an outer and an inner coil. When the unit is in operation, the inner and outer coils rotate at different r.p.m., respectively depending upon the outgoing and incoming strip. The film-strip, to be guided, for example for projection, through a projector, is brought out of the storage means by the inner turn of the inner coil and, after passing through the projector, is fed to the outer turn of the outer coil. Since the strip brought out, and the strip returned after projection, have the same rate of travel, whereas the inner and outer turns in the storage means are of different diameters, the inner and outer turns must move in different r.p.m. Thus, in the case of the known technique, the inner part of the applied storage means is driven at a speed which differs from that of the outer part thereof. These different speeds are influenced by separate control devices governed by the strip elements brought out.

The disadvantage of this method is that the r.p.m. of the inner and outer coils are governed entirely by the respective inner and outer turns of the two coils. All turns between the inner turn of the inner coil and the outer turn of the outer coil, which increase in diameter, proceeding from the inside to the outside, by a differentially small amount, move at different rotational velocities between those of the inner and outer coils. All turns in the strip-storage means must move past each other at differential amounts of their rotational velocities, which again must produce friction at the surfaces of the strips.

As illustrated in U.S. Pat. No. 3,722,809, two groups of rollers are typically utilized. A group of inwardly inclined rollers carries the end. The two groups of rollers are driven at different speeds. This allows accurate adjustment of only two turns of the coil. These are, of necessity, the inner and outer turns of the stored strip. All other turns lying therebetween will have to execute an additional sliding movement on the rotating rollers. Finally, it is a disadvantage for the turns to have to carry out, in the course of the whole winding procedure, a constant shifting from the outside to the inside over the two groups of rollers. This makes it quite possible for the surfaces of the strip, which in the case of film must be handled with great care, to bear upon each other and be thus damaged. As a result of the inclined arrangement of the two groups of rollers, in addition to the relative horizontal movement between the turns of the strip, there is a second vertical movement. This produces additional friction between the turns of the strip, and the turns thereof suffer additional damage each time the strip passes through the apparatus.

It is, therefore, the object of the invention to provide an apparatus for winding an endless strip in a storage means, such as to avoid any friction between adjacent strips or coils, and to ensure reliability throughout the entire winding procedure and eliminate excessive tensile stresses in the strip.

It is a further object of this invention to provide such an apparatus which is suitable for varying amounts of film.

It is a further object of this invention to provide an apparatus which is structurally simple to produce.

SUMMARY OF THE INVENTION

These objects are achieved in that two coils substantially in the same horizontal plane are used, in which the turns lie directly adjacent each other with no substantial air-space between them, along their whole length, the said coils, apart from the connection through the internal longitudinal section of the strip, being freely rotatable in relation to each other and being spaced radially apart; and in that all turns in the one coil are driven, by the element, or elements, associated with this coil, about axes coaxial with the coils, at the same angular velocity, the angular velocity in the case of the outer coil corresponding to that of the outer turn thereof and, in the case of the inner coil, to that of the inner turn thereof.

The advantage of the invention is that since the two coils are freely rotatable because of the radial distance, the said coils may be driven independently of each other at different speeds, without causing longitudinal displacement, with the inevitable friction, between the turns of the strip.

It is advantageous to take the external, loop-like longitudinal section of the endless strip, brought out from the storage means, from the inner turn of the inner coil and, after it has passed through a projector, for example, to pick it up again as the outer turn of the outer coil. This ensures that the inner turn is driven at a rotational velocity corresponding to the velocity of the strip leaving the projector. The difference in rotational velocity between the inner and outer coils is compensated for by the radial distance provided for in accordance with the invention. Since all turns of the inner and outer coils can basically move only at the corresponding velocity of the relevant coil, relative movement between the turns is eliminated.

In one advantageous development, the endless strip is stored in the form of more than two coils lying substantially in the same horizontal plane, and in that the angular velocities of the coils between the outer and the inner coils is lower than, or at times equal to, the angular velocity of the inner coil and at times equal to, or higher than, the angular velocity of the outer coil. This additional arrangement of a plurality of coils between the inner and outer coils makes it possible to divide the coil of stored strip according to its composition. This may be particularly useful if the stored strip consists of the entire film-program to be played within a unit of time and is made up of several separate films, or of a film in several acts.

It is desirable to apply braking to the internal longitudinal section or sections of the strip, and for the turns arising from the transfer of the strip from an outer coil to the next adjacent inner coil to lie directly against each other over their entire length, with no substantial air-space therebetween. The difference in velocity arising from the different r.p.m.'s of the individual coils is bridged by the internal longitudinal sections of strip arranged between the coils. These cause the stored strip to be wound from an outer coil onto an innner coil. They also cause, especially as slight braking is applied to the said longitudinal sections, the newly wound inner coil to have no substantial air-space between its turns, and therefore to be compact.

After the outer coil has been used by complete transfer of the stored strip, through the internal longitudinal section, to the inner coil, the angular velocity of the outer turn of the latter is now adapted to the rate of travel of the incoming external longitudinal section of strip, and a new inner coil is formed, the angular velocity of which corresponds to that of the inner turn, which is also dependent upon the rate of travel of the picked-up external longitudinal section of strip, and the new outer and inner coils are connected by means of an inner longitudinal section of strip bridging the radial distance.

The substantially faster rotation of the inner coil of strip ensures that in spite of the feeding of the strip arriving from the projector to the outer coil, the latter is completely wound onto, or put through to, the inner coil, with a unit of time. By adapting the rotational velocity of the single inner coil present, for a few seconds, on the support device, to that determined by the length of the strip fed from the outside, a new inner coil is formed between the single coil now present and the stationary core, the rotational velocity of the said new inner coil being adapted to the take-off velocity of the strip, and an internal longitudinal section, connecting the two, is now formed between the said new inner coil and the now outer coil.

The object of the invention is also achieved by means of an apparatus of the type mentioned at the beginning hereof, in that the support device consists of at least three concentric annular discs adapted to rotate about the stationary core, the outer annular disc being adapted to be driven, dependent upon the unit controlling the wind-in velocity, at a variable rotational velocity, while the inner annular disc is adapted to be driven, independence upon the unit controlling the wind-out velocity, at a variable rotational velocity, and the intermediate annular disc is adapted to be driven at a rotational velocity by corresponding either to that of the outer annular disc or to that of the inner annular disc.

Designing the elements which form the support device, and which drive the coils, as concentric annular discs produces a support device of simple design which picks up the strip material uniformly. The annular discs are arranged extremely simply, concentrically around the stationary core at the centre of the apparatus, forming therewith a substantially flat surface which is easy to clean and maintain, for example. All drive-units and control devices are arranged and protected either upon the stationary core, or below the annular discs, or under the stationary core.

Furthermore annular discs are preferably arranged, in addition to the intermediate annular disc, between the outer and inner annular discs. These additional intermediate discs make it possible to accommodate a substantially larger supply of strip in the apparatus.

It is desirable for the surfaces of all annular discs to lie approximately in the same plane of rotation, the axis of which is lying in the axis of rotation of the annular discs.

It is also desirable for the intermediate annular discs to have equal areas. Because of this, and because of design requirements, especially the drive located below the intermediate discs and the arrangement of an annular groove in which the drive and support wheels can run, the outer intermediate annular disc cannot be smaller than one to two cm.

Furthermore, the area of the inner annular disc is of at least the same area as the intermediate annular discs. However, it is desirable for the surface of the inner annular disc to be between 1.5 and 4.0 times as large as that of the intermediate annular disc. The advantage of this is that the intermediate annular disc adjacent the inner annular disc is already largely free of the superimposed strip when the inner annular disc is wound completely full. This desirable design promotes technically satisfactory operation of the apparatus according to the invention.

Moreover, the surface of the outer annular disc is at least equal to that of the intermediate annular disc, but is preferably twice as large. This design ensures that the film material to be wound onto the outer annular disc does not exceed the outside diameter of the outer annular disc and thus fall off the support device.

Furthermore, the area of the inner annular disc is smaller than that of the smallest strip-coil used operationally. The area of the inner annular disc preferably amounts to $\frac{1}{3}$ of the strip-coil in operational use. In addition to this, the sum of the areas of the intermediate annular discs is at least equal to, and preferably larger than that of the largest strip-coil to be used.

The foregoing advantageous designs of the apparatus ensure its satisfactory operation, and the preferred dimensions of the individual surfaces ensures that both large and small amounts of stored strip may be played on one and the same apparatus.

The outer and inner annular discs are each driven by a variable-speed motor, the revolutions thereof being regulated by a device as a function of the length of strip fed in or taken out per unit of time. This design allows the coils lying upon the apparatus to be driven at the operationally correct rotational velocity.

Coupling elements are arranged between adjoining intermediate annular discs and the outer annular disc, the said coupling elements being designed in such a manner that, in relation to the normal direction of travel of the apparatus, they permit higher rotational velocity of the respective inner annular discs, and also ensure entrainment at least of the rotational velocity of the outer annular disc. In this connection, the coupling elements at the outer edges of the intermediate annular discs are preferably in the form of a rotatable single-armed lever arranged to rotate about a horizontal axis located radially and running in an annular groove tangential to the edges of the annular discs, and in the form of a driver arranged at the inner edges of the intermediate annular discs and of the outer disc, running horizontally in the radial direction, the said drivers bearing against the one-armed levers hanging down under their own weight.

Since the inner annular disc, and the adjoining intermediate annular discs carried along by the said annular disc, are driven at a higher rotational velocity than the following outwardly arranged intermediate annular discs and the outer annular disc, the coupling elements between the individual intermediate annular discs and the outer annular disc must inevitably be designed to override, on the other hand they must be able to carry along an inwardly located intermediate annular disc. The preferably single-lever design allows the cpuling elements to operate without control or maintenance.

Furthermore, controllable clutches are arranged at the outer edges of the inner annular disc and intermediate annular discs, with the exception of the outer intermediate annular disc, the said clutches being controlled as a function of the diameter of the inner coil, and being used to entrain the intermediate annular discs at the rotational velocity of the inner turn of the inner coil. The clutches are in the form of lever-like rockers which are depressed by weight of the turns in a strip-coil thus being against the drivers arranged at the inner edges of the intermediate annular discs and of the outer annular disc.

These clutches, designed as rockers, allow the different intermediate annular discs to be coupled, or not, to the following outer intermediate annular disc, depending upon whether they are empty or are carrying strip. The said clutches are futhermore designed to operate automatically and entirely as a function of the constantly varying state of the strip-coil placed thereon.

The intermediate annular discs may, with advantage, be driven by their own variable-speed motors in the form of stepping motors which are connected together in groups, depending upon the number of turns carried by the intermediate annular discs. This eliminates the arrangement of coupling elements between individual annular discs, since the rotational velicities thereof are adapted to each other electrically.

In the apparatus according to the invention, it is desirable to fasten the control unit regulating the wind-out velocity of the inner strip-coil to the core. The control device responds to the position and/or shape of the section of strip, running between the inner turn of the strip-coil and the said control device, in the form of a loose loop, and influences the rotational velocity of the inner annular disc as a function of the change in position and/or shape of the said loop.

The control unit regulating the wind-in velocity of the outer strip-coil is in the form of a lever arm hinged below the annular discs and adapted to pivot horizontally about a vertical axis, the end of the said lever arm projecting beyond the outer edge of the outer annular disc carrying a deflecting roller adapted to rotate about a vertical axis, around which the strip to be wound-in is guided in the form of a storage loop between the projector and the outer coil.

The outer periphery of the stationary core, adjacent the inner edge of the inner annular disc, comprises guide rollers, spaced apart at intervals and adapted to rotate about vertical axes. When a new inner coil is being formed, the inner turn thereof bears against these rollers and can rotate about the stationary core, without friction at the velocity determined by the inner annular disc.

The horizontal surfaces of the concentrically arranged annular discs may with advantage lie against each other in a ladder-like configuration, each subsequent annular disc, as seen from inside to outside, being a few millimeters higher. The fole-like inner edge of each subsequent outer annular disc engages over the outer edge of each inwardly adjacent annular disc which is located a few millimeters lower. This preferred design eliminates any upwardly open spaces between individual annular discs, which might impede the movement of the turns of strip between the annular discs from the outside to the inside coil.

The concentrically arranged annular discs may also have inwardly inclined surfaces, the overall shape thereof being that of a very flat funnel.

Located on the core is a deflecting device following a device controlling the wind-in velocity of the strip coil, regulating the wind-in velocity of the strip coil, the said deflecting device bringing the strip to be fed to the projector, out of the inner coil and guiding it over the annular discs.

BRIEF DESCRIPTION OF THE DRAWING

Other objects, features, and advantages will be apparent from the following detailed description of preferred embodiments taken in conjunction with the accompanying drawing in which.

DETAILED DESCRIPTION OF PREFERRED EMBODIMENTS

Figure 1:
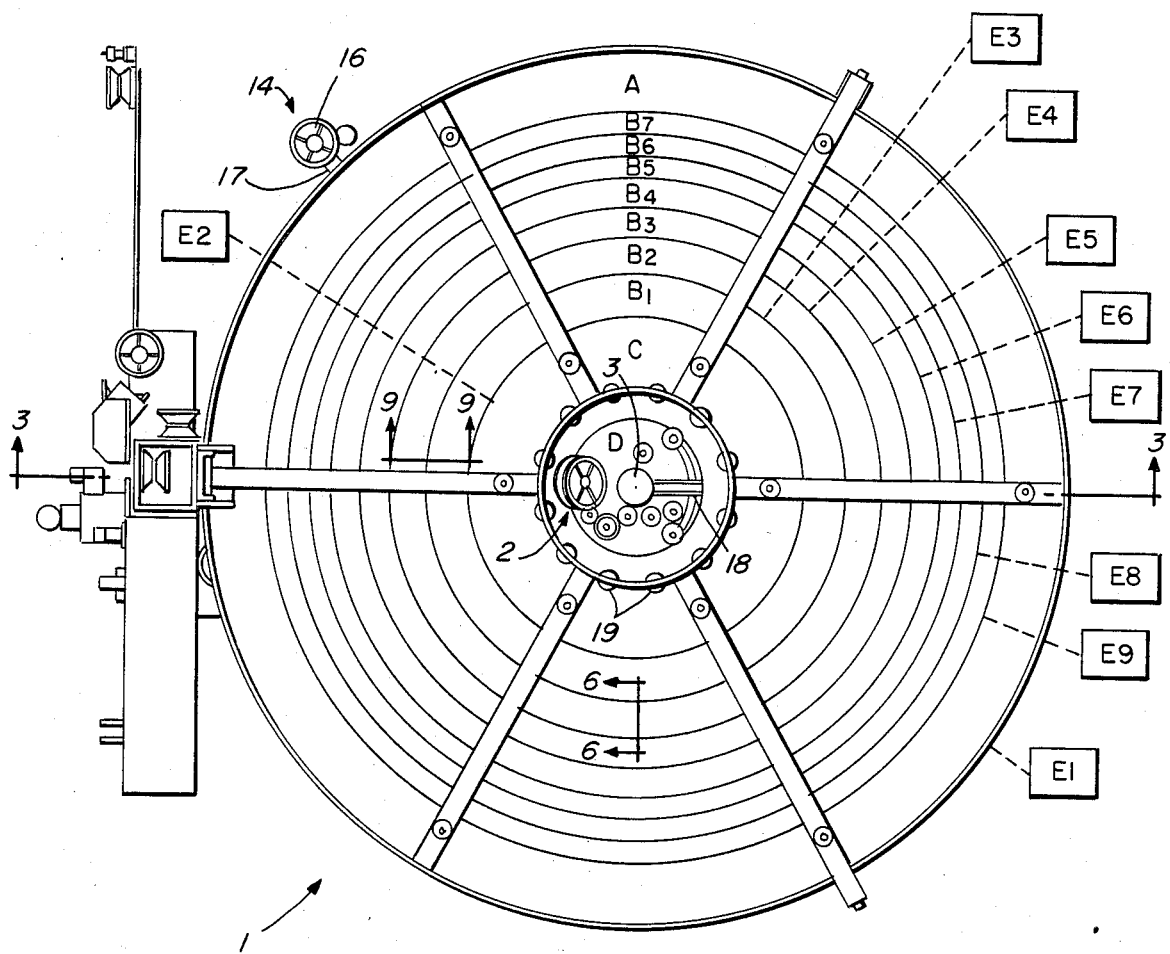
FIG. 1 is a plan partly schematic view of the apparatus.
Figure 2:
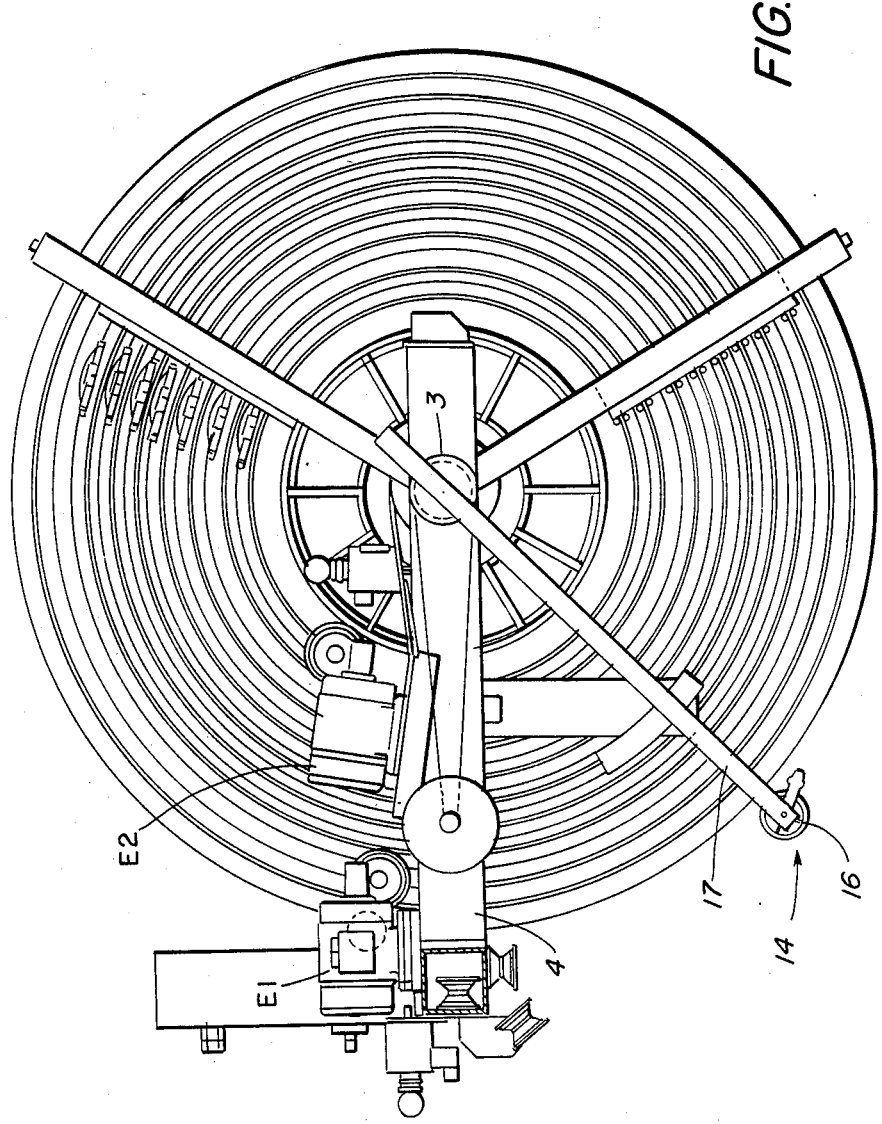
FIG. 2 is a plan view of the apparatus with the annular discs removed.
Figure 3:
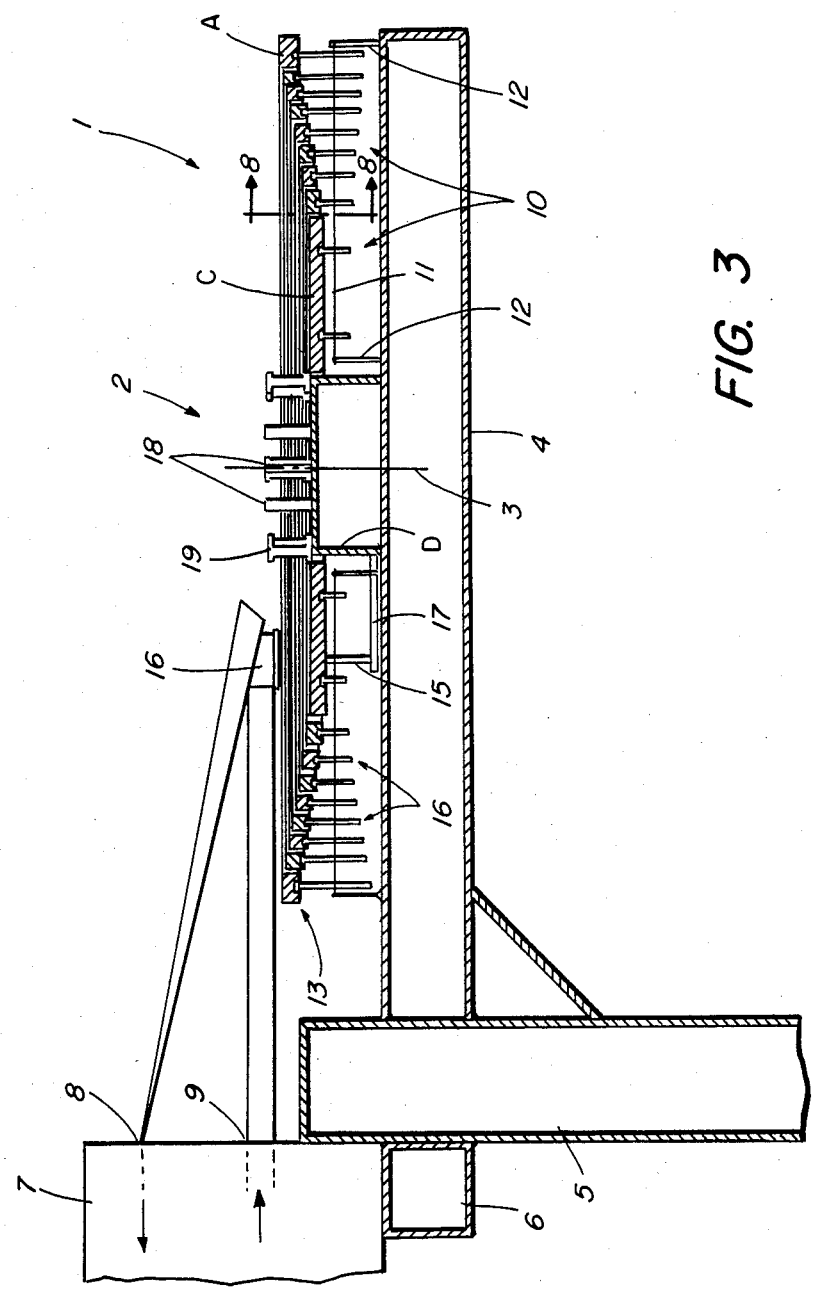
FIG. 3 is a section through the apparatus along the line 3—3 in FIG. 1.
Figure 4:
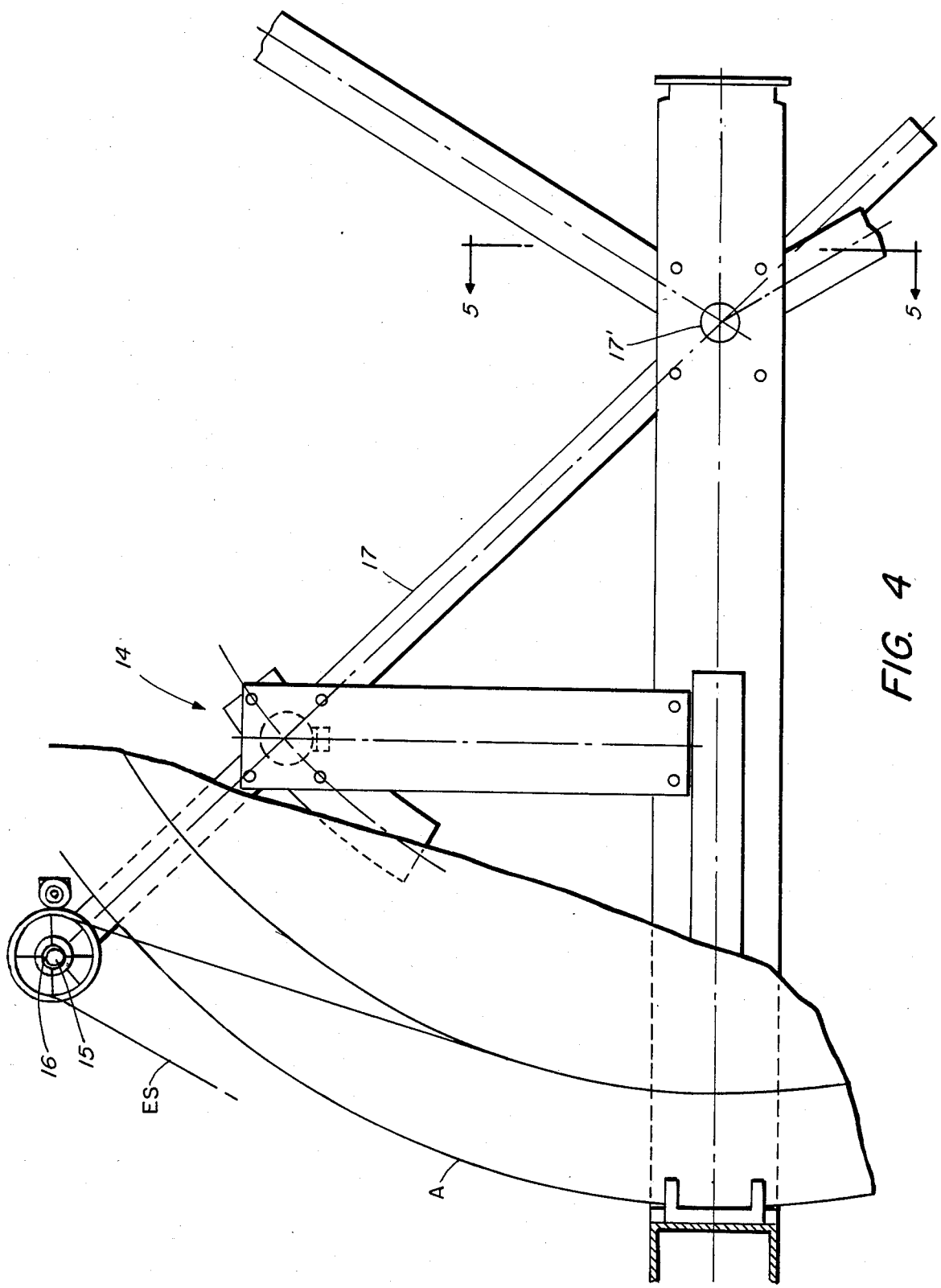
FIG. 4 is a top cutaway view of the device which controls the driving speed of disc A.
Figure 5:
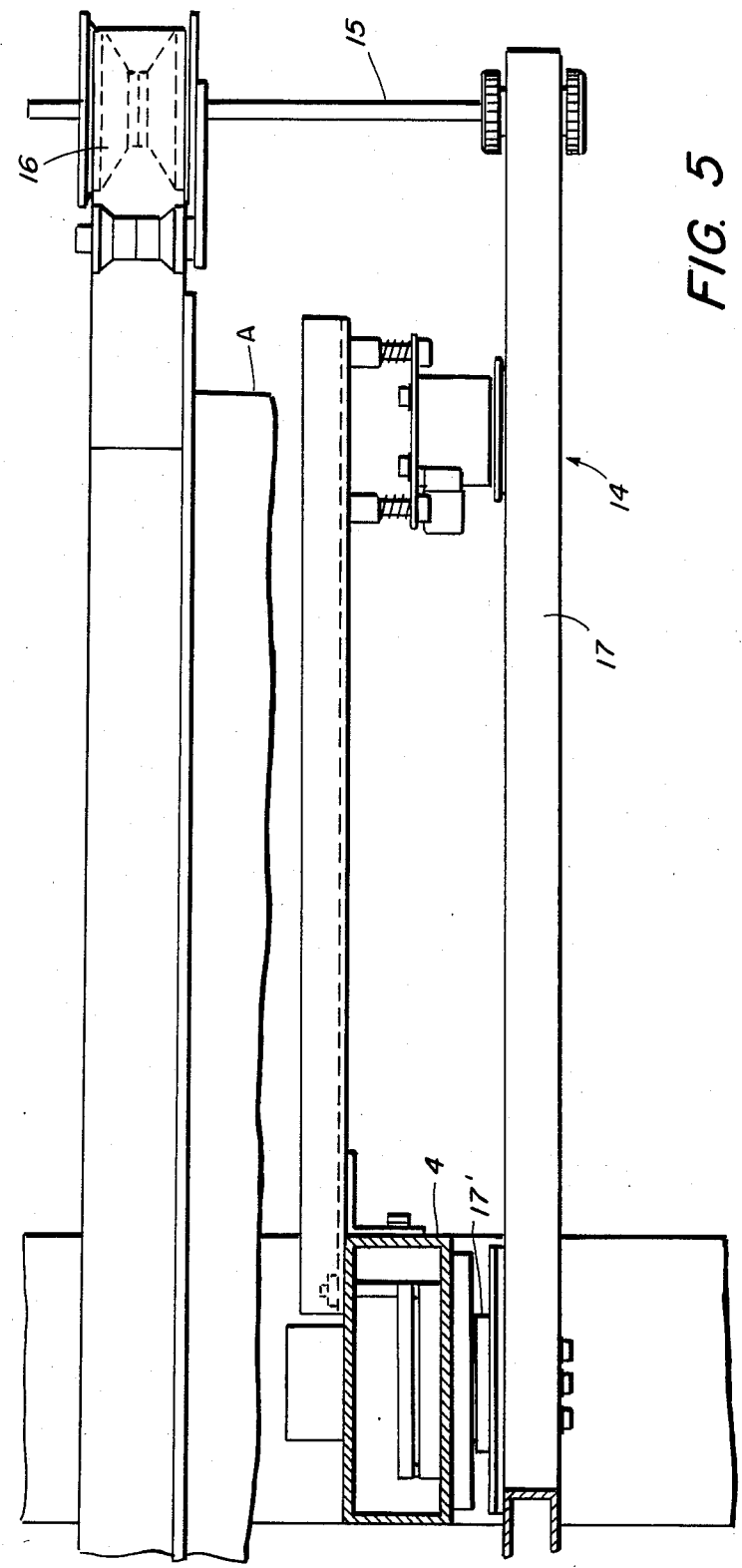
FIG. 5 is a section along the line 5—5 in FIG. 4.
Figure 11:
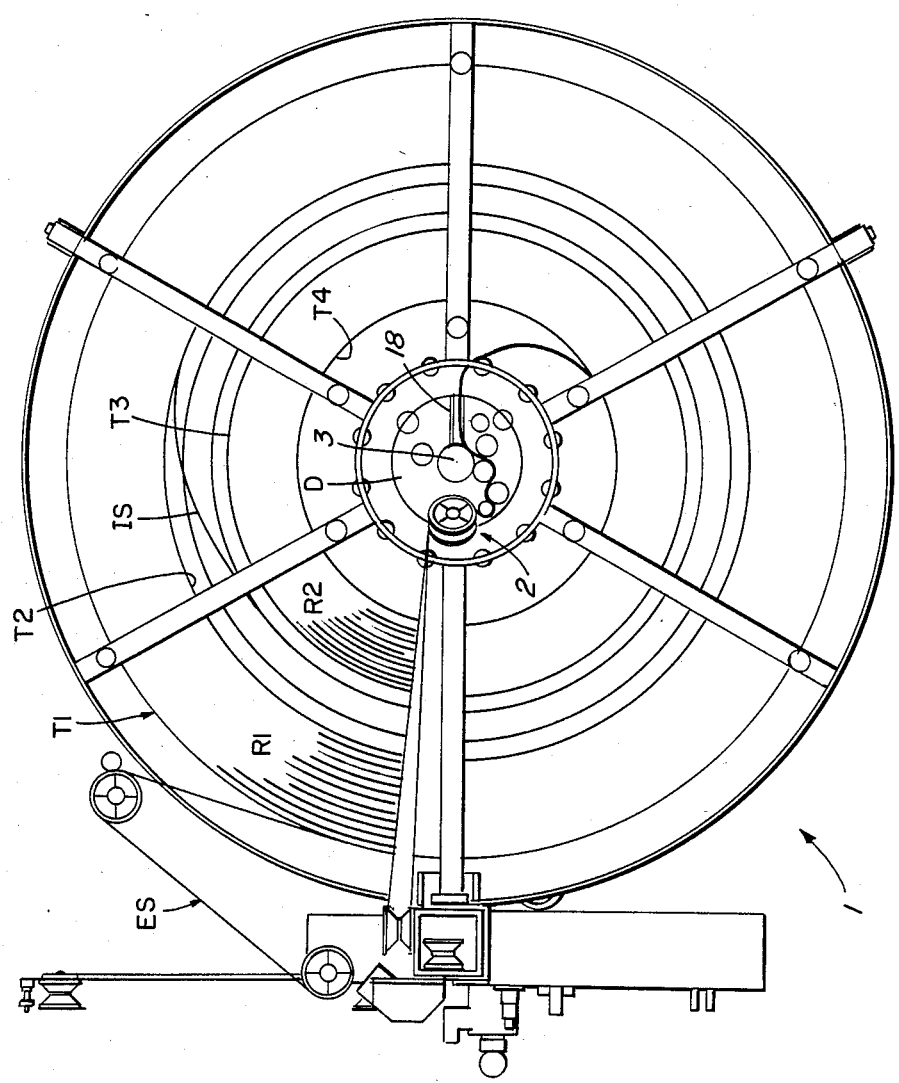
FIG. 11 is a plan view of the apparatus carrying inner and outer film coils.

The preferred embodiment, illustrated in FIGS. 1–3 of the apparatus for winding an endless strip for example, a film-strip to be shown in FIGS. 4 and 11 with a projector, consists substantially of a support device 1 upon which the coil of strip is made ready in a storage means, and of a take-out device 2 which takes the strip out of the inner turn of the prepared strip-coil.

Support device 1 consists of nine concentrically arranged annular discs arranged around a common, central, vertical axis 3. These annular discs are divided into an outer annular disc A, seven intermediate annular discs B1–B7, and an inner annular disc C. These annular discs rotate, in a counter-clockwise direction, about a centrally arranged, stationary core D which carries takeout device 2 and is secured to a cruciform holder 4 supported by a column 5. Secured to a bracket 6 on column 5 is the projector 7. The respective heights of projector 7, support device 1, and holder 4 are matched to correspond to strip guides 8 and 9. The strip emerging from projector 7 is fed to support device 2 by strip-guide 9, while the strip being fed to the projector is picked up from strip-guide 8.

Holder 4, column 5, and bracket 6 are made out of known I-beams or hollow sections.

Intermediate annular rings B1–B7 all have the same annular area, the width of each intermediate ring decreasing with increasing diameter. On the other hand, the area of inner annular disc C is four times as large as that of the intermediate annular rings.

The area of outer annular disc A is twice that of an intermediate annular disc. When the coil from guide 9 is being wound-in this prevents the last turn from falling off, although mathematically the area of the outer annular disc may be equal to the area of an intermediate annular disc.

As best shown in FIG. 3, starting from inner annular disc C, the height of all following annular discs increases by a few millimeters. The inner edges of intermediate annular discs B1–B7, and outer annular disc A, have a fold-like configuration, so that each annular disc covers the space between it and the adjacent inner disc, and also the edge thereof (FIGS. 1, 3, 6 and 9). This design prevents a turn of the film from falling and becoming jammed between, the annular discs.

All of the annular discs are mounted upon disc-wheels 10, FIG. 3. Depending upon the particular annular discs with which they are associated, the disc-wheels differ in diameter and are arranged, suitably spaced apart, upon axles 11. Axles 11, common to the disc-wheels, mounted by means of bearings 12 secured on the four arms of cruciform holder 4 (FIG. 3). Each annular disc has, on its underside, an annular groove 13, shown more clearly in FIG. 6, except annular disc C which, because of its greater width, has two such grooves. These grooves serve as tracks for disc-wheels 10 and also provide accurate concentric guidance for the individual annular discs. The design accuracy of annular grooves 13, and the lateral tolerances between them and the disc-wheels, require that the spaces between the annular discs be predeterermined.

Of all the annular discs, only inner disc C and outer disc A are driven respectively by separately arranged motors, E2, E1, FIG. 2. For instance, outer annular disc A may be driven by electric motor E1 mounted upon holder 4 in the vicinity of column 5, by a friction wheel at its outer edge. Inner annular disc C may also be driven by means of a friction-wheel on its underside. It is essential that both drives be governed in relation to the strip wound-in and wound-out. To this end, two independent devices 14, 18 are provided to control the rotational velocity of the relevant annular discs.

The rotational velocity of outer annular disc A is governed, as a function of the wind-in velocity of the strip fed by guide 9 to projector 7, by a control-device 14, FIGS. 1-5. This device has a lever arm 17 pivotably mounted at 17', FIG. 5, to holder 4 beneath rings A–C. A vertical axle 15 is mounted to the distal end of level 17 beyond outer ring A. A guide roller 16 is rotatably mounted to axle 15. The strip S, FIG. 4, to be wound into the apparatus is guided around roller 16 to outer ring A. Lever arm 17 is connected to an electrical unit controlling the rotational velocity of motor E1 which operates a friction wheel to outer annular disc A. Deflecting roller 16 can yield, against the action of a spring, to the tension arising in strip-guide 8, thus influencing the control device through lever arm 17, in such a manner that the wind-in velocity is reduced or increased by outer annular disc A. Inner ring plate C is driven by a friction wheel operated by motor E2 which is fastened to stationary core D and which operates in conjunction with device 2 for bringing the strip out of the inner turn of the strip coil. This device is the object of U.S. Pat. No. 3,780,959, issued Dec. 25, 1973, to the same applicant, and will, therefore, not be described in detail at this time.

Common to both control-devices is the fact that they actuate a regulating device influencing the relevant annular discs, the said regulating device consisting essentially of adjusting motor E1, E2, and a three-phase transformer adjusted thereby. Depending upon the feed from the switching means provided, the adjusting motor rotates to increase or reduce the voltage taken from the said three-phase transformer, and this produces a corresponding increase or decrease in the r.p.m. of the motor, fed from the said transformer, which drives the annular discs.

Guide-rollers 19, FIG. 3, rotate about vertical axes, are arranged at specific intervals around the outer edge of inner stationary core D. The inner turn of the outgoing strip may bear temporarily upon these rollers. Guide-rollers of this kind are omitted only where the strip being taken off is fed to control and take off device 18, 2.

Since, when the apparatus is in operation, the various annular discs are loaded with coils of strip, it becomes necessary for the corresponding intermediate annular discs to be driven at the rotational velocity of either outer annular disc A or inner annular disc C. To this end, two different clutch systems are provided.

Figure 6:
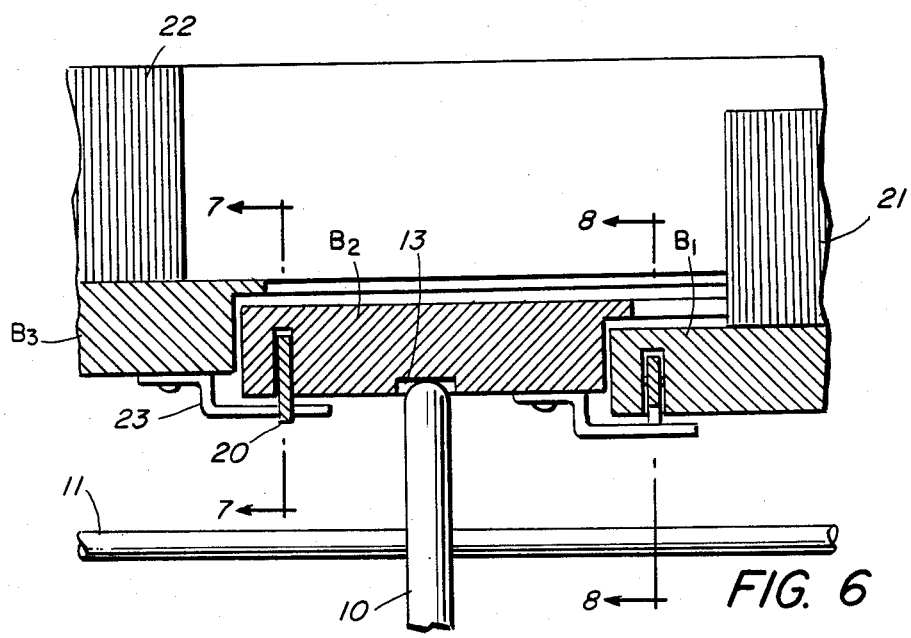
FIG. 6 is a partial section along the line 6—6 in FIG. 1.
Figure 7:
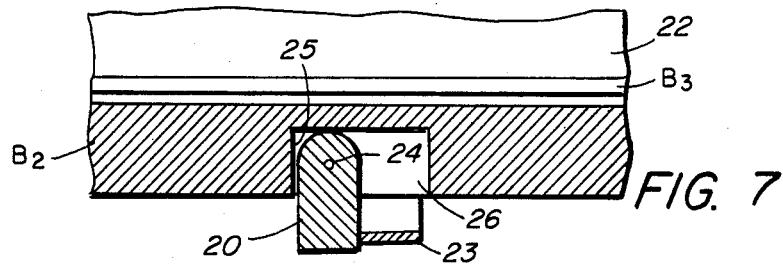
FIG. 7 is a section along the line 7—7 in FIG. 6.
Figure 8:
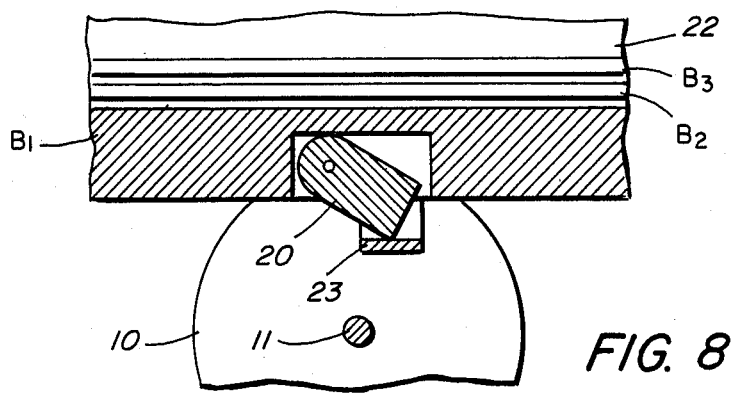
FIG. 8 is a section along line 8—8 in FIG. 6.
Figure 9:
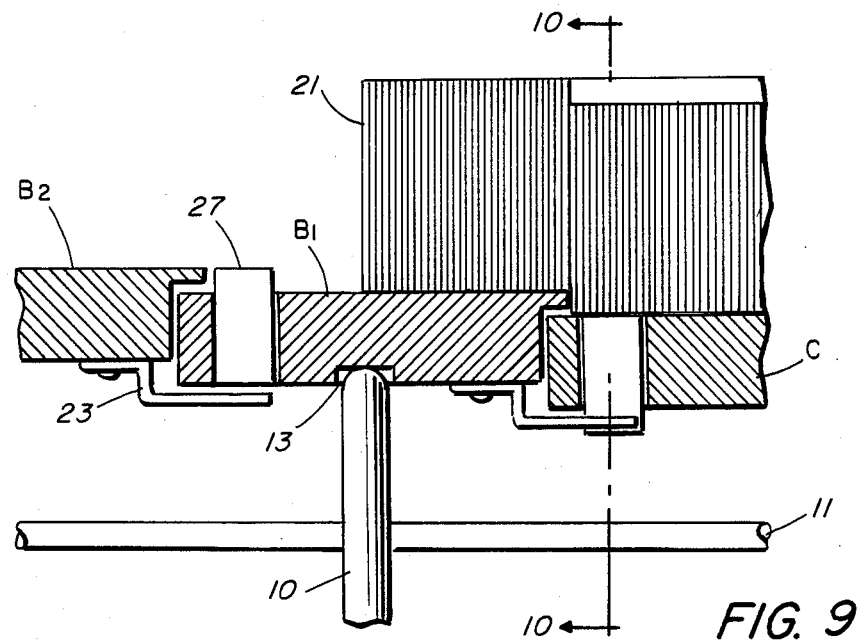
FIG. 9 is a section along line 9—9 in FIG. 1.

FIGS. 6, 7, and 8 illustrate the system of override-clutches 20. FIG. 6 is a partial section through intermediate annular discs B1, B2, and B3. Discs B1 and B3 carry parts of film coils 21 and 22. Inner coil 21 rotates with intermediate annular disc B1 at the rotational velocity of inner annular disc C which is governed by the wind-out velocity of the inner turn of coil 21. Outer coil 22, on the other hand, rotates with intermediate annular disc B3, and remaining discs B4–B7, at the rotational velocity of outer annular disc A, which is again governed by the wind-in velocity of the outer turn of coil 22. In view of the difference between the wind-in and wind-out velocities, intermediate annular disc B1 must rotate faster than disc B3. Intermediate annular disc B2, which is arranged between these two annular discs and does not yet carry any turns of strip, could still rotate freely or, in theory, remain stationary. The design, however, is such that it is carried along, by override clutch 20 and an angular driver 23, by intermediate annular disc B2. Driver 23 of disc B3 bears against override clutch 20 which is rotatable about an axis 24 and hangs vertically downwards. The said override clutch, in turn, bears against lateral wall 25 of recess 26. This causes intermediate annular disc B2 to be carried along by outer disc B3 at the same rotational velocity, FIG. 7.

On the other hand, override clutch 20 of intermediate annular disc B1 may pass driver 23 of more slowly rotating disc B2, since override clutch 20 may rotate about its axis 24 and lie in recess 26. As soon as driver 23 is overriden, the weight of clutch 20 will cause it to hang down again, FIG. 8.

This arrangement of override clutches ensures that all intermediate annular discs B1–B7 always move at the same rotational velocity as outer annular disc A.

If an intermediate annular disc is to be moved faster, i.e. as a result of being occupied by inner strip-coil 21 growing outwardly from inner annular disc C, the corresponding intermediate annular disc must be coupled to the more rapidly rotating inner annular disc. This is the purpose of controllable clutches 27 which are in the form of lever-rockers, FIGS. 9 and 10. These clutches are arranged at the outer edges of inner annular disc C and intermediate annular discs B1 to B6. In the disengaged position they may bear against drivers 23 and carry along the intermediate annular disc next adjacent on the outside. Clutches 27 are arranged to pivot about axles 29' in recesses 28 which are open right through from the top to the bottom surface of the annular discs.

Figure 10:
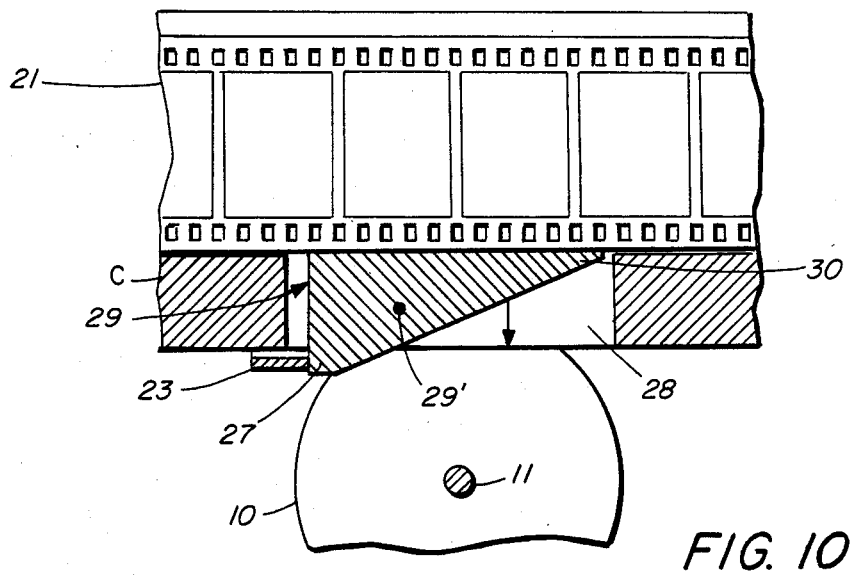
FIG. 10 is a section along line 10—10 in FIG. 9.

The said clutches are of substantially triangular shape, FIG. 10, with the shortest side 29 of the three sides located at the front in the direction of rotation. Axle 29' is arranged, in relation to the lever-rocker design of the clutch 27, in such a manner that acute angle 30 thereof, which is opposite shortest side 29, moves downwardly under the weight of the clutch, thus allowing driver 23 to pass.

On the other hand, if growing coil 21, with its increasing number of turns, rests upon the clutch projecting from the surface of the intermediate disc, the said clutch is depressed by the weight of the turns and shortest side 29 bears against driver 23 of the adjacent outer annular disc, carrying it along at the same rotational velocity.

In another configuration, neither override-clutches 20, clutches 27, nor the necessary drivers 23 are provided. Instead, not only outer annular disc A and inner annular disc C, but all intermediate annular discs B1–B7 are driven by their own motors E3–E9. To this end, use may be made of synchronous motors controlled as a function of the rotational velocity of either the outer annular disc or the inner annular disc. Engagement of the next intermediate annular disc to be occupied by the coil, which is growing from the inside to the outside, is then controlled by suitably arranged conventional photoelectric cells of sensors.

In conjunction with the foregoing examples of embodiment, a description will now be given of a method for winding (putting through) an endless strip in a storage means.

The endless strip used in a 35 mm film having a total projection time of about 2 hours. A program of this kind usually comprises several parts, for instance an advertising film, a preliminary film and the feature film. When delivered to the movie theatre, these part-films are in different cans, and the feature film itself may be divided into cans of equal and more convenient size. The projectionist will, therefore, wind the individual films consecutively onto support-device 1, gluing them together, until the total length of the film is on the support-device. It is essential for the projectionist first of all to cover inner annular disc C, and possibly a small portion of first intermediate annular disc B1, with an imposable core, thus starting the film-strip on intermediate annular disc B1 and covering subsequent annular disc B1 and covering subsequent intermediate annular discs B2 to B7. It should be noted that the area of inner annular disc C is smaller than that of the smallest coil used. If an apparatus of this kind is also to be used for short films, inner annular disc C must have a substantially smaller area than that in the example herein described. This, of course, means that for the same given outside diameter of the carrier, the number of intermediate annular discs increases.

After the entire film has been placed on the carrier, the projectionist will remove the detachable core, thus exposing inner annular disc C. He must then thread the start of the film, i.e. the first turn of the film-coil, through control device 19 located upon stationary core D, pass it around the various deflecting rollers of take-out device 2, and then, over the imposed coil, to projector 7. The strip emerging from projector 7 is then passed around a control-device 14, and deflecting roller 16 thereof, arranged outside the outer edge of outer annular disc A, and is glued to the end of the film on the support-device. This provides the endless strip required for execution of the method according to the invention.

The projectionist may then operate the apparatus by remote control, since no rewinding or threading of the film into projector 7 is needed. The projectionist may, therefore, operate a plurality of such apparatuses from a central control desk.

When the film is to be shown, all that is required is to switch-on the projector and the apparatus. Projector 7 then begins to draw the film-strip, through control and take-out devices 18, 2, from the coil placed upon the support-device. At the same time, the film-strip emerging from the projector is wound onto the outer turn of the coil on the carrier. This means that the whole coil of film, covering intermediate annular discs B1 to B7, must initially rotate at a velocity such that there is neither too much tension or too much slack in strip guide 9. Outer annular disc A, which is driven by electric motor E1, thus carries along, at a suitable rotational velocity, by means of engaged override clutches 20 and relevant drivers 23, all of the intermediate annular discs B1 to B7. When the apparatus is started up, only inner annular disc C is empty. This disc rotates at a velocity substantially higher than the remaining disc, the rotational velocity at the inner edge of disc C being substantially higher than the take-off velocity of the film-strip and the control and take-out device. Between control unit 18 on stationary core D and the inner turn of the imposed film-coil, there is formed a section of strip in the form of a loose loop passing over inner annular disc C, and this section is carried along by the friction produced by this rapidly rotating disc. Within 5 seconds of start-up, a new inner strip-coil is formed around stationary core D, the inner turn thereof bearing against guide-rollers 19 arranged in a circle. The outside diameter of this inner turn increases constantly, while the inside diameter of the coil first imposed, which is now the outer coil, decreases. Control unit 18, located on stationary core D responds to the position and/or shape of the section of strip running between it and the inner turn of the inner coil and thus controls the rotational velocity of inner annular disc C, at all times, in such a manner that the rotational velocity of the inner turn of the inner coil corresponds to the take-off velocity of strip-guide 8, and thus to the projection velocity. Because of the considerable difference between the rotational velocities of the inner and outer strip-coils, the inner coil grows substantially faster than the outer coil. As soon as the inner coil has filled inner annular disc C, adjacent intermediate annular discs B1 and B2 are already—at least partly—empty. As shown in FIGS. 6 and 7, the weight of inner coil 21 has, in the meanwhile, depressed clutch 27, with driver 23 carrying along adjacent intermediate annular disc B1. Thus B1 and C rotate at the same velocity, and inner coil 21 can easily grow on disc B1. The procedure outlined above continues until the outer coil is reduced to nothing. This is possible because the increasing outside diameter of the inner coil, and its substantially higher rotational velocity in relation to the outer coil, causes it to grow at an increasing rate, while the outer coil decreases more rapidly. It decreases faster than it can be increased by the strip would onto the outside. This means that, after about 35 minutes, the outer coil is used up. At this time, inner annular disc C, and all intermediate annular discs B1 to B7, are rotating at the same velocity. If the final outside turn of the outer coil is would onto the outside diameter of the inner coil, increased tension appears in strip-guide 9 as a result of the increased velocity of the inner coil. Control unit 14, with deflecting roller 16, is moved towards projector 7.

Through level-arm 17, this movement actuates a regulating device which disengages from annular disc C the single coil, being for a short time (as in the initial stage), the only coil lying upon intermediate annular discs B1 to B7 on the supporting device. As a result of this, discs B1 to B7 are now carried along by outer annular disc A, by override clutches 20 and drivers 23. Control unit 14 moves back again and now adjusts the r.p.m. of the coil according to the tension in strip-guide 9. At the same time, and as described at the beginning hereof, a new inner coil has formed upon inner annular disc C and at the guide-rollers 19 of stationary core D. Thus the stored film is wound or put through several times (in the case of the apparatus described, three to four times) during the two hour projection period.

The stock of film imposed rests upon the annular discs and, in contrast to all known apparatuses, it has no internal movement of each turn relative to each other. There is thus no friction between the turns, the surface of the film is not impaired, and the quality of projection is considerably improved.

Furthermore, the film may be wound very tightly. In order to achieve this, it is desirable that the section of strip between the inner and outer coils, which moves at a very high speed, be braked slightly. This produces a certain amount of tension in the strip and the inner turn is wound substantially more tightly. This makes it possible to reduce the area of the carrier. However, there is no need to brake this inner connecting loop as between the two imposed film-coils.

As shown in FIG. 11 the inner and outer film coils are arranged in two concentric but spatially separate rolls R1, R2. The outer turn T1 of the outer roll R1 is connected, via an external section ES from the strip which is being wound out along guide 8, to the inner turn T4 of inner roll R2. The inner turn T2 of outer roll R1 is directly connected via a lateral section IS of the strip to outer turn T3 of inner roll R2. During the complete circulation process the distribution of the film in the two rolls changes completely. The internal diameter of the outer roll R1 and the external diameter of the inner roll R2 continuously increase in size due to a greater angular velocity of the inner roll R2 compared with that of outer roll R1. Moreover, the internal diameter of inner roll R2 and the external diameter of outer roll R1 continuously increase due to the removal of film from inner roll R2 and the additional of that film to outer roll R1.

When the film in outer roll R2 is depleted the inner roll R1, now containing the entire film coil, assures the angular velocity of depleted outer roll R2, e.g. the angular velocity of the inner roll.

Figure 12:
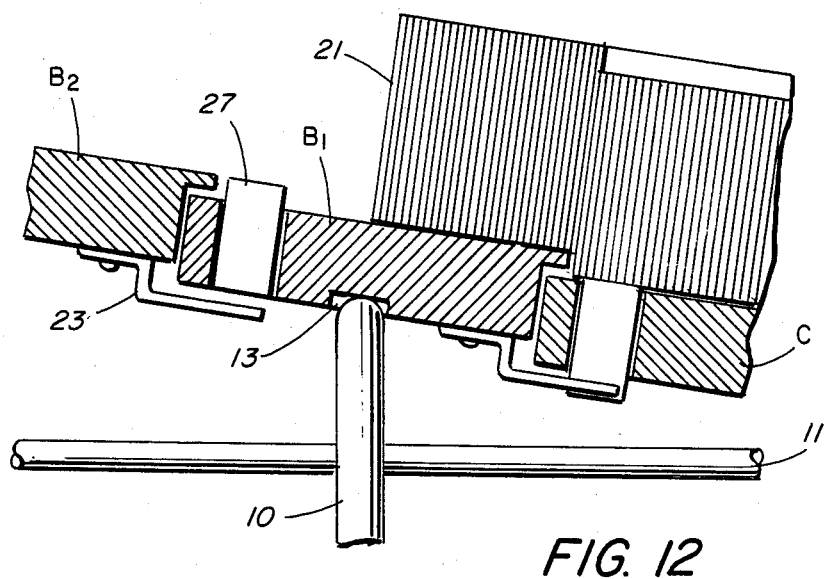
FIG. 12 is a cross sectional view of an embodiment in which the discs are inwardly inclined.

As shown in FIG. 12, the annular discs C, B, B$_2$may include inclined horizontal surfaces such that the upper surfaces of the discs are shaped, on the whole, like a very flat funnel. Otherwise the inclined disc embodiment operates identically to the horizontal disc embodiment as described in connection with FIGS. 9 and 10.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. An apparatus for winding in a storage means an endless film-strip in the form of two concentric coils having a substantially vertical axis of rotation, the outer turn of the outer coil being connected, through an external, looped longitudinal section of the strip, to the inner turn of the inner coil, while the inner turn of the outer coil is connected directly, through an internal longitudinal section of strip, directly, through an internal longitudinal section of strip, to the outer turn of the inner coil, said apparatus comprising:

(a) support means comprising a stationary core centrally arranged in said support means and at least three driven annular discs arranged concentrically about said core for carrying the coils, each annular disc having inner and outer edges and being constructed and arranged to rotate about said stationary core;

(b) means for driving each of the outermost and innermost annular discs at a variable rotational velocity; and (c) coupling means arranged on the inner and outer edges of said discs for selectivity coupling one or more of the intermediate discs with either an innermost or outermost disc so that such intermediate discs may be driven at a rotational velocity corresponding to that of the outermost annular disc or the inner most annular disc.

2. Apparatus in accordance with claim 1 and further comprising:

(a) means for synchronizing the rotational velocity of each intermediate disc with one of the innermost or outermost discs, said means for synchronizing including coupling elements of the outer edges of the intermediate annular discs, said coupling elements comprising: (1) means defining a rotatable single-armed lever arranged to rotate about a horizontal axis located radially and running in an annular groove tangential to the edges of the annular discs; and (2) means defining a driver at the inner edges of the intermediate annular discs, and of the outermost disc, running horizontally in the radial direction, the said drivers bearing against the one-armed levers which hang down under their own weight, such structure constituting an entraining drive with elements (1) and (2).

3. Apparatus according to claim 1, characterized in that the concentrically arranged annular discs have inwardly inclined surfaces, being shaped, on the whole, like a very flat funnel.

4. Apparatus according to claim 1 wherein said coupling means including entrainment elements attached to each of the outermost and intermediate annular discs and complementary retractable clutch means carried by each of said innermost and intermediate discs, said clutch means being retractable when overtaking and engaging said entrainment elements to permit higher velocity of respective inner annular discs and on the other hand remaining extended when overtaken and engaged by said entrainment element to ensure entrainment of the intermediate discs at at least the rotational velocity of the outermost annular disc.

5. Apparatus in accordance with claim 1 including drivers arranged at the inner edges of the intermediate annular discs and of the outermost annular disc and complementary lever-like rockers which are depressable by the weight of the turns in a strip-coil to engage the respective drivers of the intermediate annular discs and entrain the intermediate annular discs at the rotational velocity of the innermost turn of the inner coil.

6. Apparatus in accordance with claim 1 wherein said annular discs include horizontal surfaces which lie adjacent to each other in a ladder like configuration, each subsequent annular disc, as seen from inside to outside, being a few millimeters higher and further wherein the inner edge of each subsequent outer annular disc is disposed over the outer edge of each inwardly adjacent annular disc which is a few millimeters lower in a fold-like manner.

7. Apparatus in accordance with claim 1 wherein means are provided for driving the intermediate annular discs including a respective variable speed motor for each intermediate disc.

* * * * *